Feb. 10, 1970 — P. D. BIDDLE — 3,494,226

POWER TRANSMISSION ASSEMBLY

Filed June 24, 1968 — 2 Sheets-Sheet 1

INVENTOR.
PAUL D. BIDDLE
KENDRICK and SUBKOW
BY
George J. Netter
ATTORNEYS

Feb. 10, 1970     P. D. BIDDLE     3,494,226

POWER TRANSMISSION ASSEMBLY

Filed June 24, 1968     2 Sheets-Sheet 2

INVENTOR.
PAUL D. BIDDLE
BY KENDRICK and SUBKOW

*George J. Netter*

ATTORNEYS

United States Patent Office 3,494,226
Patented Feb. 10, 1970

3,494,226
POWER TRANSMISSION ASSEMBLY
Paul D. Biddle, Los Angeles County, Calif., assignor to Findlay A. Carter, Los Angeles, Calif.
Filed June 24, 1968, Ser. No. 739,220
Int. Cl. F16h 1/42, 1/44
U.S. Cl. 74—711                                6 Claims

ABSTRACT OF THE DISCLOSURE

Support beam load bearing axles disposed in end-to-end relation are rotatably mounted in a fixed structure also having a plate rotatably mounted therewith. The plate has members which rotatably engage the adjacent ends of the axles holding them in alignment. Two cages of positive held rollers selectively drive the slowest rotating axle. The rollers are provided with a set of gear teeth which frictionally engage specially formed surfaces to effect the desired driving relation.

---

This invention relates to devices for transmitting power from one input shaft to two output shafts; and more particularly to a device for transmitting all of the power from the input shaft to the slowest one of the two output shafts.

BACKGROUND OF THE INVENTION

Although the device of the present invention may have other uses and should therefore not be limited to that specifically disclosed herein, it has been found to have special utility when employed in lieu of a differential in land vehicles.

Differentials that are used in automobiles today drive the fastest rotating wheel. This means that when one rear wheel of a car is on a concrete highway and the other rear wheel of the car is on, say, a soft earthen shoulder, the other wheel will spin and receive the full output torque of the motor, whereas it would be most desirable for the slower wheel to receive all of the torque.

In the past an attempt has been made to overcome the disadvantage of differentials in driving the faster one of a pair of wheels of a motor vehicle. One form of such prior art structures includes two cages of metal rollers wedged between metal shafts for selectively driving the slowest one of a pair of wheels. A structure similar to an overriding clutch is thus employed. When the drive is transferred from one set of rollers to another, the device is subjected to a severe mechanical loading. This is due to the fact that the wheel axles are independent and are heavily loaded. These axles therefore acutally deflect or bend and such bending initiates binding during changes in driving engagement of the rollers. The cages themselves are weak and the independent axles make matters worse. Also, this device has a great many moving parts and is slow in changing from a position driving one wheel to a position driving another wheel.

All of these peculiarities of the above prior art structure produce several serious operating disadvantages. The independently loaded axles and many moving parts cause such a device to wear out very rapidly. They are also frequently damaged in their own operation. The rollers become flat when one set comes out of a wedged engagement and the other set is rapidly driven into a wedged engagement by a large torque. The rollers also freeze or jam, and the noise and vibration which is attendant upon a change in roller engagement is so great as to prohibit its use. The noise and vibration is, in fact, so great that a motor vehicle operator cannot tell whether or not the device is defective or is operating normally. Further, the noise is so loud that it can be a substantial nuisance.

Another known device which overcomes many of the disadvantages of the above-described prior art structure is that set forth in U.S. Patent No. 3,310,997, Power Transmission Assembly, by Paul D. Biddle. In this patent there is disclosed a device for driving the slower one of two separate beam load bearing axles disposed in end-to-end relation and rotatably mounted in a fixed structure with a plate rotatably mounted on said fixed structure. The plate has means on it to engage rotatably the mutually adjacent ends of the axles to hold the axles in alignment with each other. In this case, the axles are supported at their inner ends so that vibration is substantially reduced when a changeover is effected between the drives of the axles. Wear is thereby minimized and damage is completely avoided. Further, the support of the mutually adjacent ends of the axles improves the strength of each. The axles are more securely mounted and jamming is thereby avoided. Further, the prior art disadvantage of flattened sides of the metal rollers is also avoided.

Although the power transmission assembly disclosed in the patent is advantageous over the overriding clutch type of differential, it has been found in practice to be too noisy to make it generally acceptable for use in passenger cars.

OBJECTS AND SUMMARY OF THE INVENTION

It is, therefore, a primary object of the present invention to provide a transmission assembly in which caged rollers relate driving torque to the slower rotating wheel with power application change from one wheel to another being accomplished in a relatively noise-free and smooth manner.

A further object is the provision of power transferring surfaces in a cage type differential having improved frictional interengagement of driving and driven parts.

In accordance with the practice of this invention the rollers carried by the cages have their outer surface formed into gear teeth which provide high friction surfaces for engaging those parts that drive the rollers. Those parts that are driven by the rollers similarly include gear teeth for positive connection with the rollers.

The above described and other advantages of the present invention will be better understood from the following description when considered in connection with the accompanying drawings which are to be regarded as merely illustrative.

Figure 1:
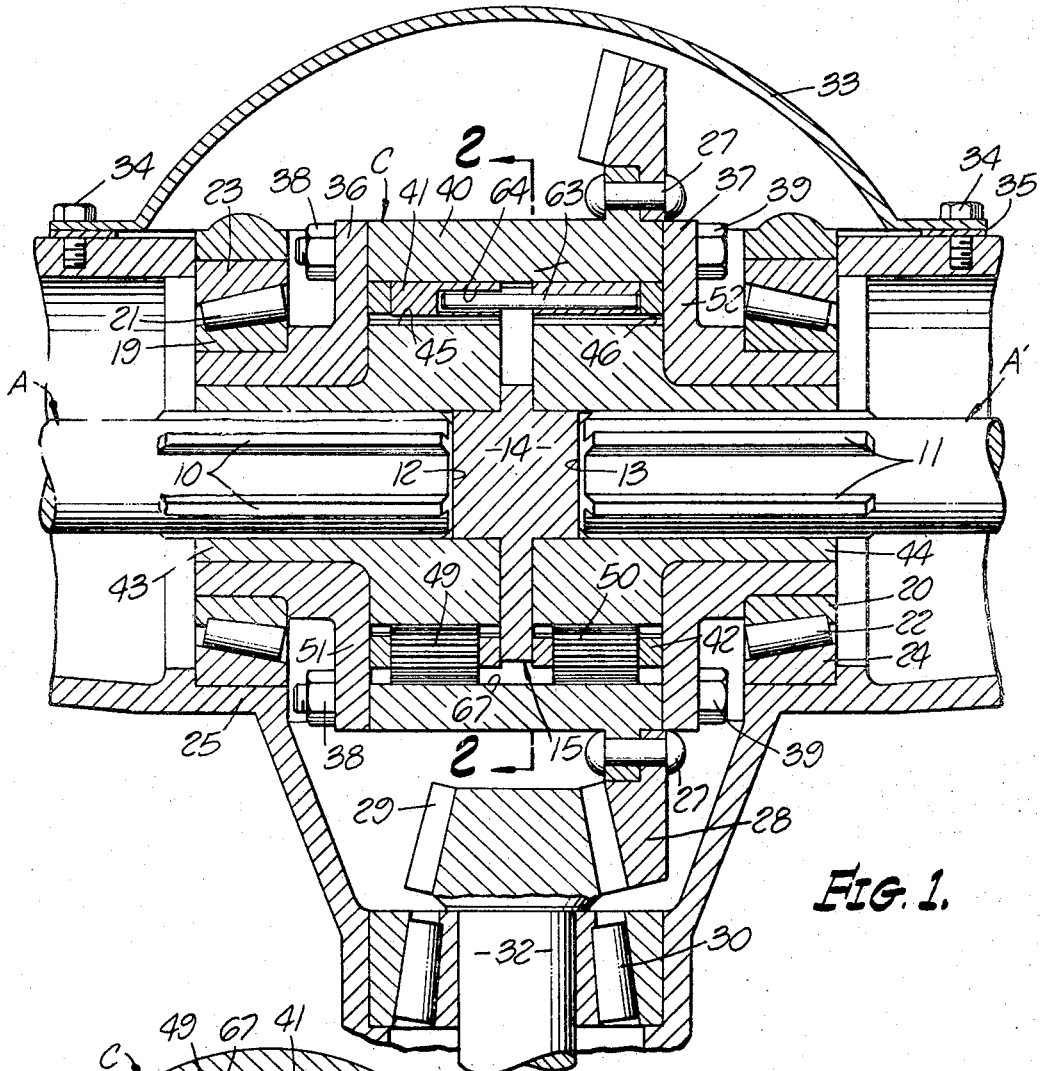
FIGURE 1 is a longitudinal sectional view through a device of the invention to take the place of a conventional differential in, for example, an automobile.
Figure 2:
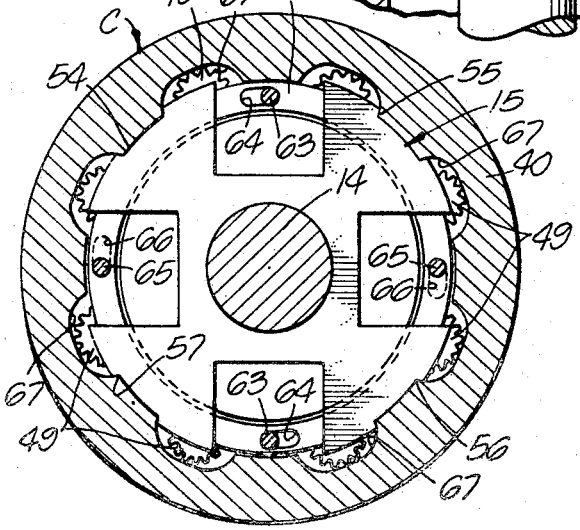
FIGURE 2 is a transverse sectional view through the device taken on the line 2—2 shown in FIGURE 1, the section of FIGURE 1 being indicated at 1—1 in FIGURE 2.

In the drawing in FIGURE 1, a pair of axles A and A′ are splined at 10 and 11, respectively. Axles A and A′ terminate at ends 12 and 13, respectively, adjacent a hub 14 of a spider 15 (FIGURE 2). Other than the fact that ends 12 and 13 of axles A and A′ are spaced apart at hub 14, axles A and A′ may be identical to the selfsame axles so labeled in the Patent 3,310,997.

The device of the present invention is provided with a fixed housing 25 which likewise may be identical to housing 25 shown in the patent. The same is true of a source power shaft 32, an anti-friction bearing 30 therearound, a driving pinion gear 29, rivets 27, and a ring gear 28, which is fixed to a cylindrical case C by the rivets 27.

A cover for housing 25 is provided at 33 and is fixed thereto by bolts 34. A gasket is provided at 35 between cover 33 and housing 25.

Also shown in FIGURE 1 are inner bearing races 19 and 20, bearings 21 and 22, outer bearing races 23 and 24, all of which are identical to parts identical and of identical movements shown in the drawing of the patent.

A pair of annular bodies 36 and 37 are bolted together at 38 and 39 through a cylinder 40. Roller bearing cages 41 and 42 are rotatable to a small degree in side cylinder 40 between it and corresponding axially slotted members 43 and 44, respectively. Members 43 and 44 are slotted internally to receive and hold drive axles A and A', respectively, by the splined connection. Members 43 and 44 have specially formed cylindrical clutch faces 45 and 46, respectively, which are engaged by similarly formed surfaces as will be more fully described later herein.

With reference now additionally to FIGURE 2, it is seen that cage 41 is provided with 8 rollers 49 and cage 42 is provided with 8 rollers 50. End plates 51 and 52 are provided for cages 41 and 42. Cages 41 and 42 are rings of rectangular cross section except for portions cut out of the same as indicated at 53 in FIGURE 3 to accommodate rollers 49 and 50. End plates 51 and 52 are rings of a uniform rectangular cross section throughout their circumferences and are secured, such as by welding, to cages 41 and 42 to maintain rollers 49 and 50 therein.

Spider 15 has its peripheral edge formed into a plurality of recesses 54–57 permitting the spider to be fittingly received within the cylinder 40 (FIGURE 2). By virtue of this construction, the spider is constrained from movement relative to the cylinder.

Figure 3:
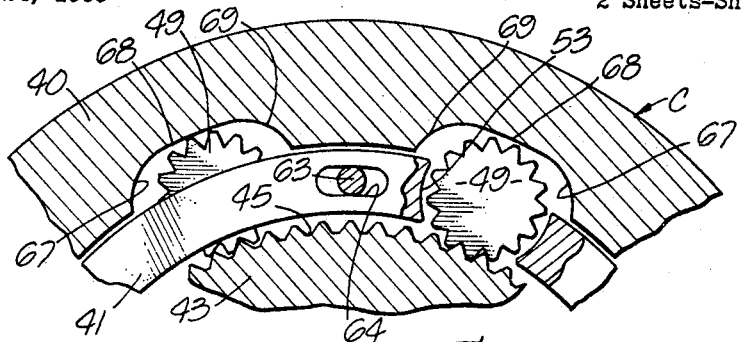
FIGURES 3, 4 and 5 are enlarged fragmentary operational views.

As seen on comparing FIGURES 1, 2 and 3, cage 42 has a pair of pins 63 fixed thereto which extend into corresponding slots 64 in cage 41. Similarly, cage 41 is provided with pins 65 which project into slots 66 in cage 42. Pins 63 and slots 66 are symmetrical with rollers 50.

Cylinder 40 has its inner surface formed into a plurality of concave declivities 67, one for each set of rollers 49 and 50, that receive the outermost portions of the rollers therein. More particularly, as viewed along the axis of cylinder 40 each declivity includes a central portion 68 which lies on the circumference of a circle concentric with the cylinder 40, and terminates at each end in a circular curved region 69 of diameter substantially identical to that of the rollers 49, 50. Without regard to operation, it is seen that the rollers can assume a central position (FIGURE 3) in which the gear teeth do not contact the declivity walls, or positions at either extreme of the declivity where frictional engagement between the outer ends of several of the gear teeth is established with a surface 69.

Although not meant to confine the present invention to a particular form of roller construction, the best configuration known to date for the rollers is that of an elongated cylinder with the gear teeth having flattened outwardly directed ends. By such a roller construction, receipt of the roller within the similarly dimensioned surfaces 69 provides secure frictional engagement between the cylinder and rollers preventing slippage which can produce objectionable noise.

A further aspect is the provision of gear teeth on the peripheries of members 43 and 44 for meshing with the rollers 49 and 50. In this manner, positive driving engagement of the rollers and members 43 and 44 is maintained at all times.

When separated at the very center, the structure inside case C in the lefthand half of FIGURE 1 is identical to that in the righthand half. For this reason, only the cage 42 and the structure on the right side in FIGURE 1 is described in detail. By identical, what is meant is that although, for example, pins 65 on cage 41 are not at the same angular position as pins 63, each race does have a pair of pins which are symmetrically disposed with each corresponding set of rollers 49 and 50. The same is true of slots 64 and 66, pins 62, etc.

Figure 4:
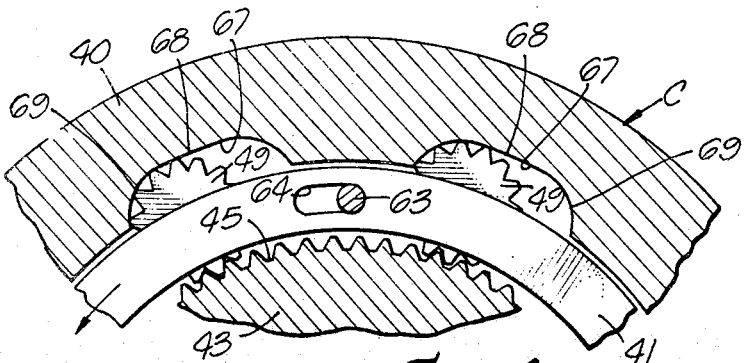
Figure 5:
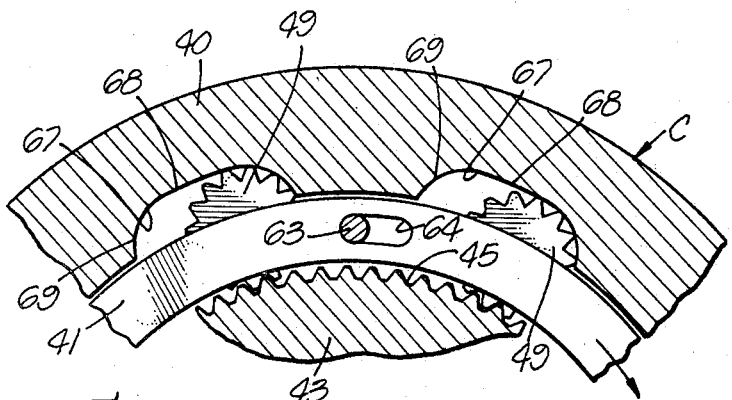

The views of FIGURES 4–5 are operational. One operational view has been omitted. This is the view in which both axles A and A' are driven. This view would be identical to that of FIGURE 3 with the exception that pins 63 would be moved to the left side shown in FIGURE 5.

The operation of the present invention is identical to that of the transmission assembly described in the above referenced patent, and for that reason only one mode of operation will be described here. In general, driving power from the shaft 32 is supplied via ring gear 28 to the cylinder 40 and from there to the members 43, 44 and the respective axles A, A' by the rollers 49 and 50. FIGURES 3–5 illustrate the three possible relationships of rollers 49 to the driving surface 67 of cylinder 40. FIGURE 3 shows the rollers 49 in a central position out of contact with the surfaces 67–69. FIGURES 4 and 5 show the engagement of the rollers at respectively opposite sides of the central neutral position. As is definitively set forth in the above identified patent, these various driving relationships of the rollers 49 and 50 are produced by coaction of the restraining effect of the pins 63 and 65 (confined within the respective slots 64 and 66) on the cages 41 and 42. More particularly, by this cooperative action the slower rotating axle, A or A' as the case may be, receives the greater amount of driving torque from shaft 32 and this is accomplished smoothly and with a minimum amount of transmission noise during transfer of power from one axle to the other.

By virtue of the toothed surface construction of the rollers 49 and 50, members 43 and 44, and the special geometry of drive surfaces 67–69, slippage that occasionally occurred in the patented assembly is completely eliminated. It was the failure of frictional retention between the smooth rollers and associated driving surfaces in the patented assembly which produced the noise considered objectionable for use in passenger cars.

Although only one specific embodiment of the present invention has been shown and described, many changes and modifications thereof will, of course, suggest themselves to those skilled in the art. The invention is, therefore, not to be limited to this single specific embodiment selected for this disclosure, the true scope of the invention being defined only in the appended claims.

What is claimed is:

1. In a power transmission having two separate beam load bearing axles disposed in end-to-end relation; a fixed structure; a housing rotatably carried by said fixed structure, said housing surrounding the mutually adjacent ends of said axles; a plate braced in said housing; alignment means on said plate extending around each of said mutually adjacent axle ends to hold said ends thereof in a position such that the axis of one of said axles lies in alignment with the axis of the other one thereof, the clearance between said means and an axle being sufficiently large to permit said axle to rotate about its axis relative to said means; and clutch means between said housing and both of said axles holding the slowest one of said axles stationary relative to said housing, said clutch means including a hollow cylinder affixed to an end on each of said axles, a cage around each cylinder, and a set of roller gears in each cage to become wedged between the slowest cylinder and said housing.

2. In a power transmission, having two separate beam load bearing axles disposed in end-to-end relation; a fixed structure; a housing rotatably mounted on said fixed structure, said housing surrounding the mutually adjacent ends of said axles, said axle ends being splined; hollow splined circumferential clutch cylinders on said axle ends; a spider braced in said housing; a cylindrical appendage on each side of said spider to fit inside said hollow cylinders; and clutch means between said housing and both of said axles holding the slowest one of said axles stationary relative to said housing, said clutch means including a hollow, splined, clutch cylinder on the said splined end on each of said axles, a cage around each cylinder, and a set of rollers in said housing, the improvement comprising said rollers being provided with gear teeth for frictionally engaging said housing.

3. In a power transmission having a fixed structure; two separate beam load bearing axles disposed in end-to-end relation and rotatably mounted in said fixed structure; a plate rotatable on said fixed structure, said plate having alignment means thereon to engage rotatably the mutually adjacent ends of said axles to hold said axles in alignment with each other; and clutch means between said housing and both of said axles holding the slowest one of said axles stationary relative to said housing, said clutch means including a hollow, splined clutch cylinder on the said splined end on each of said axles, a cage around each cylinder, and a set of roller gears in each cage for being wedged between the slowest cylinder and said housing.

4. In a mechanism for transmitting rotative power to the slower moving of two axles disposed in aligned, end-to-end, spaced relation, separate spur gears affixed to each axle, separate sets of roller gears meshed with the respective gears, and a hollow cylinder drivingly related to the rotative power surrounding the roller gears and including declivities on the inner surface for receiving each roller gear, each of said declivities having a central region of dimensions sufficient to permit the associated roller to rotate free from contact with the declivity wall, and two end regions of each declivity being of reduced dimension such that the roller gear can be wedged therein to provide driving relation between the cylinder and axles.

5. In a mechanism for transmitting rotative power as in claim 4, in which the end regions of said declivity are of such dimensions as to wedgingly receive less than a full quadrant of the associated roller gear.

6. In a mechanism for transmitting rotative power as in claim 4, in which the outer end surfaces of the roller gear teeth are flattened.

References Cited

UNITED STATES PATENTS

| | | | |
|---|---|---|---|
| 2,550,750 | 5/1951 | Abelt | 74—711 |
| 2,791,919 | 5/1957 | Wildhaber | 74—711 X |
| 2,837,936 | 6/1958 | Fackler | 74—711 |
| 2,978,929 | 4/1961 | Roberts | 74—711 |

FOREIGN PATENTS 1,115,547  10/1961  Germany.

LEONARD H. GERIN, Primary Examiner

U.S. Cl. X.R.

74—714